United States Patent [19]

Hirao

[11] 4,283,065

[45] Aug. 11, 1981

[54] APPARATUS TO PREVENT LEAKAGE OF LIQUID

[75] Inventor: Mamoru Hirao, Okayama, Japan

[73] Assignee: Kagaku Kenkyujo Kabushiki Kaisha Hayashibara Seibutsu, Okayama, Japan

[21] Appl. No.: 29,470

[22] Filed: Apr. 12, 1979

[30] Foreign Application Priority Data

Apr. 12, 1978 [JP] Japan .................................. 53/42762

[51] Int. Cl.³ .............................................. F16J 15/44
[52] U.S. Cl. ................................ 277/135; 277/DIG. 1
[58] Field of Search ...................... 277/1, 135, DIG. 1

[56] References Cited

U.S. PATENT DOCUMENTS

| 3,645,544 | 2/1972 | Unsworth | 277/DIG. 1 |
| 3,868,104 | 2/1975 | Hunt et al. | 277/DIG. 1 |

FOREIGN PATENT DOCUMENTS

| 886988 | 8/1953 | Fed. Rep. of Germany | 277/DIG. 1 |
| 636301 | 4/1950 | United Kingdom | 277/DIG. 1 |
| 670938 | 4/1952 | United Kingdom | 277/DIG. 1 |

*Primary Examiner*—Robert I. Smith
*Attorney, Agent, or Firm*—Browdy & Neimark

[57] ABSTRACT

Means for prevention of leakage of liquid from liquid reservoirs are disclosed. Leakage of liquid from reservoirs may be prevented by applying compressed air or gas to the exterior edge of the interface of sliding or revolving elements of such reservoirs.

1 Claim, 9 Drawing Figures

The distance between slit ($b$) and nozzle ($d$), ($l$) (mm)

APPARATUS TO PREVENT LEAKAGE OF LIQUID

FIELD OF THE INVENTION

The present invention relates to a method and an apparatus to prevent leakage of liquid, by applying compressed air or gas to the exterior edge of the interface of sliding or revolving elements utilized as part of the elements making up a reservoir.

BACKGROUND OF THE INVENTION

Sliding contact of or between elements constituting a reservoir, seals intended to close the interface between revolving shafts on which agitator blades are mounted and reservoirs wherein such blades operate (such as crystallizers), and seals of piston rods, valves and stopcocks, have always been points where liquid leakage and the problems it entails are expected to occur due to excessive wear and change in acceptable tolerances.

Prevention of liquid leakage at these points have been difficult to overcome. For example, since end plates provided at the both ends of top-fed double drum dryers, used for drying various solutions such as food concentrates, are positioned in such a manner that the drums rotate in sliding contact with the end plates, the sliding contact sections will invariably develop unacceptable tolerances, where, leakage of liquid becomes unavoidable. The same can be said for the end plates of a roller coater to apply adhesives or paints, or those of a transfer roller for printing inks. Further, adequate tolerances are necessary to assure smooth rotation or movement of revolving shafts, agitator blades and sliding rods mounted on various vessels. The provision of packings at these points has prevented leakage of liquid satisfactorily due to packing wear.

SUMMARY OF THE INVENTION

The object of the present invention is to provide a method and an apparatus to eliminate the problem of liquid leakages in reservoirs due to development of unacceptable tolerances caused by wear between moving parts such as seals, bearings and stopcocks with interfaces extending to the exterior of the reservoir by applying compressed air or gas at the point of expected exterior leakage.

The following experiment clearly demonstrates the feasibility of eliminating liquid leakage through application of compressed air or gas at a point of known leakage.

DETAILED DESCRIPTION OF PREFERRED EMBODIMENTS

Figure 1:
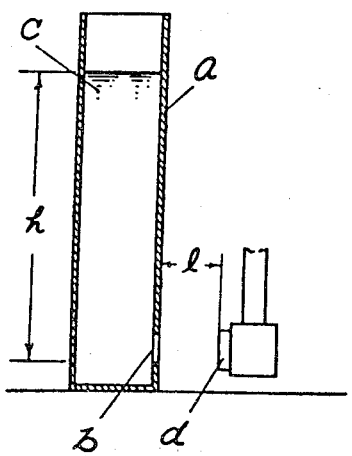
FIG. 1 is a schematic drawing illustrating an experiment used to demonstrate the effectiveness of pressurized air in shutting off the leakage of liquid from a reservoir.
Figure 2:
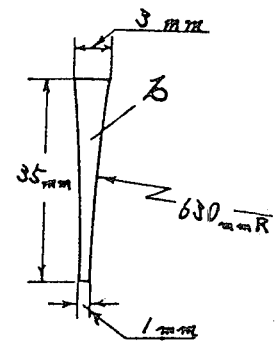
FIG. 2 is a schematic view showing the dimensions of the slit b of FIG. 1.
Figure 3:
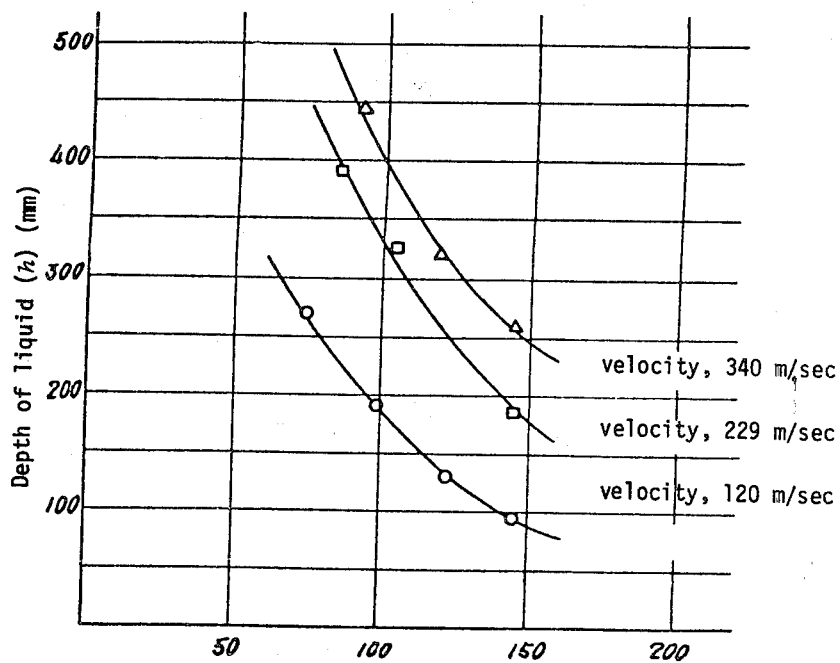
FIG. 3 is a graph plotting the depth of the liquid in the reservoir FIG. 1 as a function of the distance between slip b and nozzle d for various air pressure velocities.

A vertical cylinder (a), 125 mm in diameter and 650 mm in height as shown in FIG. 1 for use as a reservoir was, provided with slit (b) with a, sectional area of 0.7 $cm^2$, 50 mm from the bottom of the cylinder as shown in FIG. 2. The slit was shaped to give an opening profile similar to that of the lower tapered part of the approximately V-shaped space formed between the drying drums of a double drum dryer rotating toward each other, from which leakage of liquid has been previously unpreventable. A 21.5 w/w% aqueous pullulan solution, viscosity of 20,000 cp, was used as the liquid (c) and fed into the cylinder. Nozzle (d) was mounted in a position to allow perpendicular application of air to slit (b). Three nozzles different with rectangular outlets, 40 mm high and 0.5 mm, 1.0 mm and 2.0 mm wide, were used in applying air at room temperature and respective velocities of 340 m/sec, 229 m/sec and 120 m/sec. The distance between slit (b) and nozzle (d) was expressed as (l) and the depth of liquid (c) when it began leaking during testing from slit (b) as (h). The different tests conducted are given in the following Table and the results plotted in FIG. 3.

TABLE

| Dimensions of nozzles (mm) | Distance (Z) (mm) | Depth of liquid (h) (mm) | Flow rate of air (l/min) | Air velocity (m/sec) |
|---|---|---|---|---|
| 0.5 × 40 | 145 | 260 | 410 | 340 |
| 0.5 × 40 | 120 | 320 | 410 | 340 |
| 0.5 × 40 | 92 | 445 | 410 | 340 |
| 1.0 × 40 | 145 | 180 | 550 | 229 |
| 1.0 × 40 | 105 | 325 | 550 | 229 |
| 1.0 × 40 | 85 | 390 | 550 | 229 |
| 2.0 × 40 | 145 | 95 | 580 | 120 |
| 2.0 × 40 | 123 | 130 | 580 | 120 |
| 2.0 × 40 | 97 | 188 | 580 | 120 |
| 2.0 × 40 | 75 | 270 | 580 | 120 |

As shown in the tests, the application of air to slit (b) in the cylinder proved effective in shutting off the leakage of liquid until high pressures were encountered. Further it was revealed that the higher the velocity and the flow rate of the applied air, the more liquid could be prevented from leaking, and the shorter the distance between the slit and the nozzles, the more effectively the leakage could be prevented.

Employable air or include nitrogen gas, carbon dioxide, inert gas, volatile organic gasses, air and steam, and can be chosen freely according to the liquid present in the reservoir. If necessary, the air or gas to be employed may be pre-treated by such treatments as dehumidification, heating, cooling or sterilization.

Although generally dependent on the capacity of the liquid reservoir, its internal pressure and dimensions of the slit, in practice air or gas is compressed to the range of 1–50 $kg/cm^2$ and applied to the point of leakage from a distance of approx. 5–20 cm. The nozzles may be of various shapes and dimensions in accordance with individual purposes.

Thus, the liquid-leakage-preventive method or device of the invention can be applied freely space permitting, to any apparatus, equipment or system, where liquid-leakage prevention is found difficult through conventional methods.

A drum dryer and crystallizer on which the liquid-leakage preventive device is mounted will be described to provide a better understanding of the invention.

Figure 4:
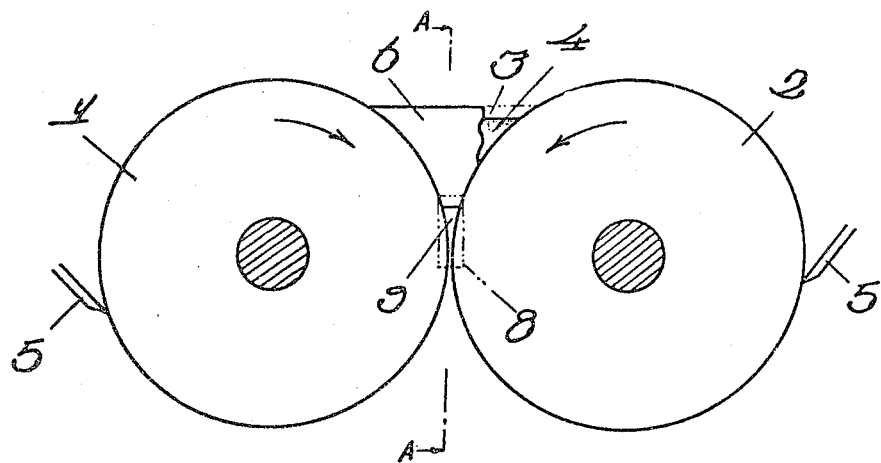
FIG. 4 is an end elevation of a top fed double drum dryer.
Figure 5:
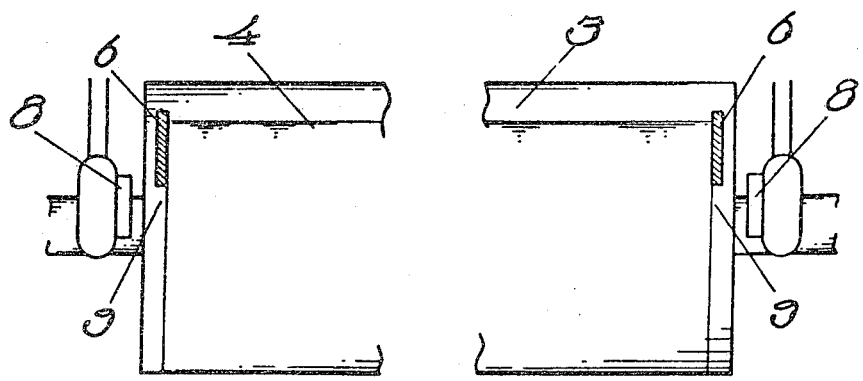
FIG. 5 is a cross sectional view of a top fed double drum drier along lines A—A of FIG. 4.
Figure 6:
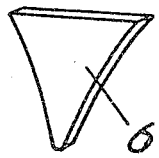
FIG. 6 is an illustration of a rigid end plate which may be used with the dryer of FIG. 4.
Figure 7:
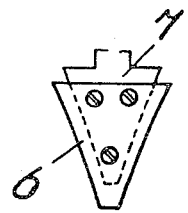
FIG. 7 is an illustration of an alternative form of flexible and resilient end plate which may be used with the dryer of FIG. 4.

A top-fed double drum dryer is shown in FIGS. 4–7. In FIG. 4, (1) and (2) are the drying drums which house appropriate heat sources. The drums are arranged so that their rotatable axes are parallel and their outer surfaces are opposite one another and spaced on the basis of the material being dried. The drums rotate toward one another. A solution (4) to be dried, and used as the liquid is fed into the V-shaped space formed between drums (1) and (2), is carried in a film form on the surfaces of the rotating drums as they move away from each other, undergoes rapid drying, and dried films are scraped off from the rotating drums by doctor knives (5). End plates (6) are placed on both ends of drums (1) and (2) in close contact with the drums to serve as the side plates forming the reservoir (3) for the liquid material being dried. In conventional double drum dryers, end plates (6) are shaped so they will fit in the V-shaped space formed between drying drums (1) and (2). Drums (1) and (2) always tend to bite off or tear off the lower tapered parts of end plates (6) due to continuous abrasion and friction, causing liquid leakage and damaging the usefulness of the dryer. End, plates from which the tips of the lower tapered parts were previously cut off as shown in FIG. 6 were used in the example. End plates (6) may be made of rigid bodies such as conventional metal plates or wooden boards as shown in FIG. 6, or of flexible and resilient plates such as leather or plastics, e.g., Teflon (Registered Trade Mark, D. I. Du Pont De Nemours & Company, Wilmington, Del., U.S.A.), as shown in FIG. 7. Although end plates (6) made of flexible and resilient thin plates as shown in FIG. 7 required supports, they are effective in maintaining close and smooth contact with drying drums (1) and (2), for longer periods. Nozzles (8) were positioned to face closely and directly at opening (9) at the lower part of end plates (6). Gas was then applied to opening (9) via nozzles (8) with a compressor.

In the top-fed double drum dryer constructed as described in the specification, liquid leakage from liquid reservoir (3) can be prevented by applying compressed gas through nozzle (8) to allow formation of a compressed gas layer outside at openings located below the end plates (6). The employment of heated air or steam as the gas to be applied helped eliminate the unfavorable hardening of the liquid at the openings around the end plates (6).

The dryer of the invention is advantageous over conventional types because the clearance between the drums can be adjusted easily to meet the variation in the liquid concentration without fear of liquid leakage even during the operation; thus the time and labor needed for maintenance and inspection for the dryer can be reduced to a great extent due to less friction between the drums and the end plates, and prolonged continuous operation is possible.

Figure 8:
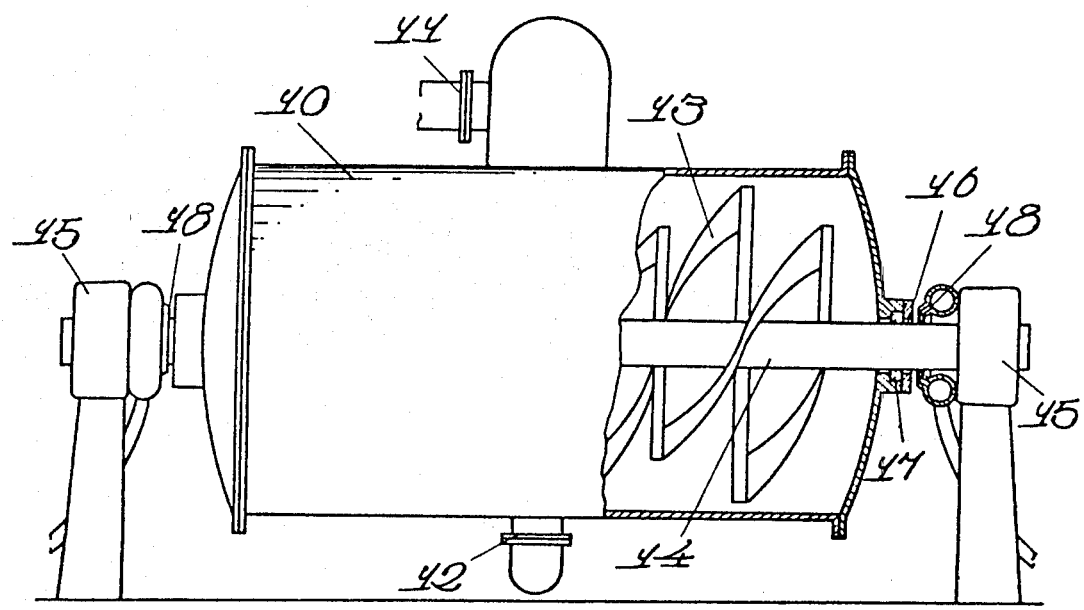
FIG. 8 is a side elevation view, partially in section, of a crystallizer having an apparatus for the prevention of leakage of liquid therefrom in accordance with the present invention.
Figure 9:
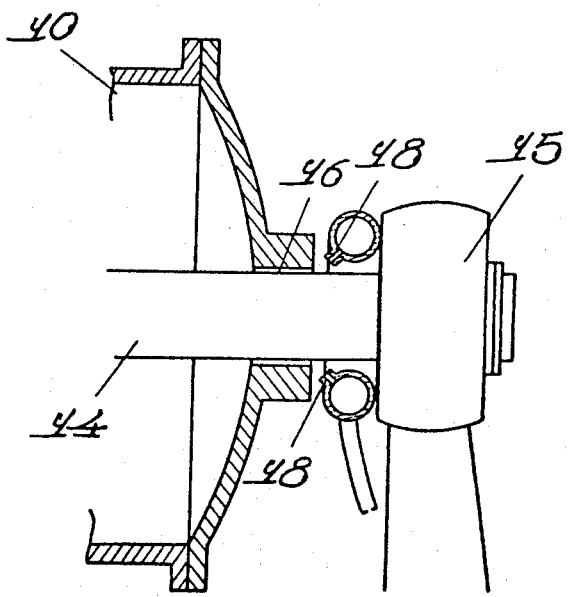
FIG. 9 is a detailed elevation view, partially in section, of the apparatus for prevention of leakage of liquid from the crystallizer of FIG. 8.

The invention will be made more clearly understood with reference to an example of a crystallizer. The crystallizer constructed in accordance with the present invention is shown in FIGS. 8 and 9. The crystallizer body (10) consist of a horizontal cylinder with inlet (11) to feed a solution as the liquid and outlet (12) to discharge slurry. A spiral agitator (13) mounted on revolving shaft (14) driven by appropriate power is installed inside the crystallizer body (10). The spiral agitator rotates inside is intended to facilitate crystallization by rotating inside crystallizer body (10). Bearings (15) are used to assure smooth rotation of revolving shaft (14). Shaft sealings (16) are intended to preclude leakage of the contents of the crystallizer body (10) through the interface between the revolving shaft (14) and the crystallizer body. As shown in FIG. 8, packings (17) are used to fill the space between crystallizer body (10) and revolving shaft (14). Shaft sealings (16) may be also employed as shown in FIG. 9. Nozzles (18) may be those with one annular continuous outlet or with outlets spaced annularly to apply compressed air or gas directly against shaft sealings (16).

In the crystallizer constructed as described in the specification, the application of compressed air or gas through the nozzle (18) forms a compressed gas layer around the shaft sealings (16), thus preventing the leakage of liquid from crystallizer body (10). In addition, due to such construction, the crystallizer has numerous advantages over the conventional types: crystallization around the inside shaft sealing (16) is preventable, packings are subjected to less abrasion and friction because excessively firm tightening is unnecessary, and entrance of dirt or foreign matters into crystallizer body (10) can be avoided. Thus prolonged continuous operation is attainable.

What we claim is:

1. An apparatus for the prevention of leakage of liquid from between the drums and end plates of a double drum drier, the end plates of which are in rotating contact with the drums, near each end thereof, with a slight open area at the bottom of the end plates near the point of closest approach to one another of the external surfaces of the drums, comprising:

nozzle means for applying compressed air or gas to the slight opening formed between the end plate and the rotating drum, said nozzle means comprising at least one nozzle disposed on the exterior of and directed toward said slight opening.

* * * * *